United States Patent [19]

Cross

[11] 4,379,729
[45] Apr. 12, 1983

[54] METHOD AND APPARATUS FOR THE PRODUCTION OF COMPOSITE SHEET MATERIAL AND A SHEET MATERIAL PRODUCED THEREBY

[75] Inventor: Sydney H. Cross, Newport, England

[73] Assignee: Tarmac Industrial Holdings Limited, Wolverhampton, England

[21] Appl. No.: 253,845

[22] PCT Filed: Aug. 7, 1980

[86] PCT No.: PCT/GB80/00125
§ 371 Date: Apr. 3, 1981
§ 102(e) Date: Apr. 3, 1981

[87] PCT Pub. No.: WO81/00375
PCT Pub. Date: Feb. 19, 1981

[30] Foreign Application Priority Data

Aug. 9, 1979 [GB] United Kingdom ............... 7927723
Aug. 9, 1979 [GB] United Kingdom ............... 7927725

[51] Int. Cl.³ .................. B28B 1/08; B32B 31/16
[52] U.S. Cl. .................. 156/73.6; 156/243;
156/244.24; 156/246; 156/324; 162/209;
264/69; 264/70; 264/DIG. 57
[58] Field of Search ............. 156/73.6, 242, 246,
156/62.8, 243, 244.24, 324/264/69, 70, DIG.-
57; 162/209

[56] References Cited

U.S. PATENT DOCUMENTS

| 3,227,590 | 1/1966 | Kurz ................................. 156/73.6 |
| 3,608,012 | 9/1971 | Jonell et al. ......................... 264/70 |
| 3,804,690 | 4/1974 | Ohno et al. ....................... 156/246 |
| 3,974,024 | 8/1976 | Yano et al. ................... 156/62.8 X |

FOREIGN PATENT DOCUMENTS

| 321805 | 4/1975 | Austria . |
| 2337728 | 2/1975 | Fed. Rep. of Germany . |
| 491650 | 8/1967 | France . |
| 2259954 | 8/1975 | France . |
| 7602067 | 8/1977 | Netherlands . |
| 209179 | 1/1924 | United Kingdom . |
| 567912 | 3/1945 | United Kingdom . |
| 567935 | 3/1945 | United Kingdom . |
| 723009 | 2/1955 | United Kingdom . |
| 1034431 | 6/1966 | United Kingdom . |
| 1098630 | 1/1968 | United Kingdom . |
| 1174711 | 12/1969 | United Kingdom . |
| 1200783 | 8/1970 | United Kingdom . |
| 1371908 | 10/1974 | United Kingdom . |
| 1402317 | 8/1975 | United Kingdom . |
| 1463769 | 2/1977 | United Kingdom . |

*Primary Examiner*—Michael G. Wityshyn
*Attorney, Agent, or Firm*—Spencer & Kaye

[57] ABSTRACT

A method and apparatus for the production of a composite sheet material and a material produced thereby are described, a typical product being a lightweight permanent or temporary formwork sheet of accurate thickness and parallelism made from material including glass fiber reinforced cement. A base or mould is moved through successive stations at which uncured but curable material is deposited in layers thereon. At least the final layer is consolidated by a local surface treatment with a vibratory screeder, the influence of which spreads through the material to promote intimate bonding together of the uncured layers. In a preferred form, the material comprises three layers, the first and third being of glass fiber reinforced cement and the central second layer being of cementitious material including a lightweight aggregate such as hollow microspheres. The screeder used on the top surface is accurately guided with respect to the base or mould to provide an accurately controlled relationship between the faces of the finished sheet.

15 Claims, 5 Drawing Figures

METHOD AND APPARATUS FOR THE PRODUCTION OF COMPOSITE SHEET MATERIAL AND A SHEET MATERIAL PRODUCED THEREBY

BACKGROUND OF THE INVENTION

This invention relates to a method and to an apparatus for the production of composite sheet material and to a sheet material produced thereby.

The invention has been devised especially in relation to sheet material for use in formwork for casting concrete, as an alternative or substitute for the conventional thick plywood sheets used at present. These plywood sheets have the disadvantages that their life is relatively short, they are susceptible to swelling and splitting in the wet environment in which they are used, and the sheets need considerable support per unit area since wood is a relatively flexible material.

In view of these disadvantages of plywood sheets, it has been proposed to use sheets of a material comprising glass-fibre reinforced cement (grc). Such sheets have good release properties when used as temporary formwork, are extremely stiff and strong and hence need less support than plywood for an equivalent permitted deflection, and are less susceptible to water damage than plywood. The sheets can be formed so as to provide a flat or alternatively a relief pattern surface on the concrete being cast.

However, currently available grc sheets have certain disadvantages. They are much heavier than plywood of the same thickness. grc is relatively expensive because of the need to use an alkali resistant form of glass fibre in the mix to prevent attack by the cementitious matrix. At present, grc sheets are laid down by a spraying process which is inherently likely to produce a slightly uneven top surface finish and so that thickness of the sheets tends to vary and the surface finish is often not even. The top surface of material has been rolled by hand to consolidate the material and then floated to produce a more or less flat surface but, in spite of the costly and time consuming nature of such hand finishing processes, the resulting sheets are still slightly non-uniform. When used in formwork, sheets are supported by wooden frameworks and it has often proved necessary to pack and shim the formwork extensively to achieve a satisfactory structure.

The invention is not limited to the manufacture of sheet material for use in permanent or temporary formwork for concrete. It is also applicable to the manufacture of sheet material for other uses, for example as flooring or cladding or for other building purposes.

SUMMARY OF THE INVENTION

It is an object of the present invention to provide a method and apparatus for the production of composite sheet material which are such that the thickness and surface finish of the material can be accurately controlled and the material can be produced less expensively than conventional grc sheets.

It is a further object of the invention to produce a new or improved sheet material which is lighter in weight than conventional dense grc sheets.

A particular aim of the invention is to produce such a sheet material suitable for use in formwork, in which the above mentioned disadvantages of currently available grc sheets are overcome or reduced.

According to a first aspect of the invention there is provided a method of producing a composite sheet material comprising the steps of taking a mould or base, depositing thereon a first layer of a curable material in a viscous flowable state, depositing on the first layer a second layer of a curable material in a viscous flowable state, the first layer having sufficient strength in its uncured state to support the second layer, consolidating the second layer by localised application of vibration to the surface thereof, and allowing the materials to cure, the materials being such that on curing the layers bond together.

The expression "viscous flowable state" as used herein includes a condition in which the material is extremely viscous and can be caused to flow only under pressure or vibration.

The method may include the additional step of depositing one or more further layers of a curable material in a viscous flowable state on the second layer, the layer deposited before the or each such further layer having sufficient strength in the uncured state to support said further layer, and consolidating the or each further layer by localised application of vibration to the surface thereof.

In the performance of the method, the mould or base may move continuously through a plurality of successive stations at which the layers are continuously deposited and consolidated.

The surface of the second or of a further layer may be consolidated by means which are guided and orientated accurately relative to the base or mould, so as to give accurate control of the relationship between the faces of the sheet material produced.

In a preferred method, three layers are deposited, the curable material of the first and third layers being glass fibre reinforced cement and that of the central second layer being cementitious and including a lightweight aggregate.

Irrespective of the number of layers, it is preferred that the curable material of each layer comprises a curable constituent and one or more other constituents, all the layers having the same curable constituent to cause bonding together of the layers on curing.

The curable constituent may be hydraulic cement or alternatively may be gypsum. The other constituents may include glass fibre or other fibrous reinforcements, lightweight aggregates such as hollow microspheres, air entraining agents, plasticisers, sand or fillers or any combination.

Viewed from a further aspect, the invention comprises an apparatus for producing a composite sheet material comprising a support affording or supporting a base or mould, first depositor means for depositing a first layer of curable material in a viscous flowable state on the base or mould, second depositor means for depositing a second layer of a curable material in a viscous flowable state on the first layer, and vibratory means adapted to apply localised vibration to the surface of the second layer in order to consolidate it.

The apparatus may additionally comprise one or more further depositor means for depositing one or more further layers of curable material in a viscous flowable state on the second layer and further vibratory means adapted to apply localised vibration to the surface of the or each further layer in order to consolidate it.

The depositor means and the vibratory means may be disposed at successive stations and the mould or base may be arranged to move successively through the stations.

In this case, one or more of the depositor means may comprise a spray head adapted to deposit a glass fibre reinforced hydraulic curable material and the spray head may be movably mounted at the associated station to traverse across the direction of movement of the mould or base.

The or each screeding means of the apparatus may be guided and orientated accurately relative to the base or mould, whereby the relationship between the surfaces of the composite sheet produced is accurately controlled.

Viewed from a further aspect, the invention also comprises a composite sheet material when made by the method set out above.

The composite sheet material may comprise a matrix of cured hydraulic cement having three thickness zones defined by the presence of different other constituents within the matrix of adjacent zones, the outer zones including alkali resistant glass fibre as such another constituent and the inner zone including a lightweight aggregate as such another constituent, the opposite faces of the sheet material having an accurately controlled relationship.

BRIEF DESCRIPTION OF THE DRAWINGS

The invention will now be described in more detail by way of example only with reference to the accompanying drawings in which:-

DESCRIPTION OF THE PREFERRED EMBODIMENTS

Figure 2:
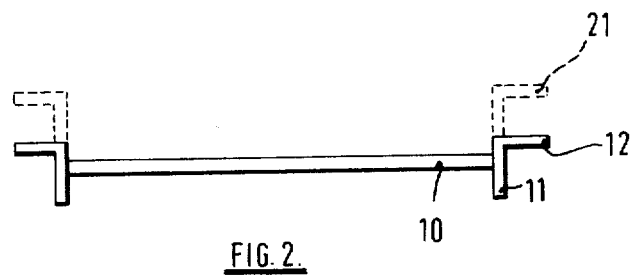
FIG. 2 is a diagrammatic end elevational view of a mould or base used in the production of the sheet material.

The process to be described is carried out continuously or semi-continuously using a base or mould having the cross-section shown in FIG. 2. This comprises a flat base plate 10 and a pair of side members 11 which are of L-shape in the drawings but which could comprise upright plates. The side members 11 are adjustable for height relative to the top surface of the base plate and have top guide edges 12 which control the positioning and orientation of a screeding bar to be described.

Figure 3:
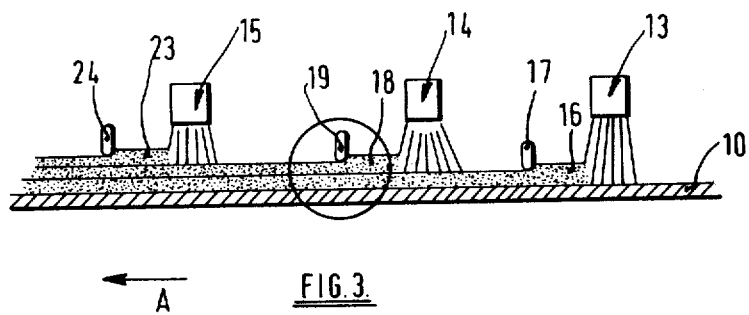
FIG. 3 diagrammatically illustrates the method of production of a sheet material having three layers.

FIG. 3 shows diagrammatically the method by which a three-layer sandwich sheet of material (illustrated in FIG. 5) is produced.

The apparatus includes first, second and third depositor stations, spaced apart successively along the direction of travel A of the mould or base plate 10. At each successive depositor station, one layer of the composite sheet is laid.

In the example to be described, the first layer 16 which is deposited at the first station 13 is a layer of glass fibre reinforced cement (grc). This is deposited in generally conventional manner by a spray head disposed at the station 13, the spray head being arranged to traverse across the base plate 10 from side to side as the base plate moves continuously in the direction of the arrow A beneath the depositor station 13. grc layer 16 is in a viscous but flowable condition. In order to provide a smooth surface and to ensure optimum compaction of the grc layer 16, a vibratory screeding bar 17 is used to screed the top surface of the grc layer. It is preferred that the screeding bar 17 is guided and orientated accurately with respect to the base plate 10, for example by being arranged to bear on the side members 11 of the base plate 10.

While the grc layer 16 is still in an uncured state the base plate 10 passes under the second depositor station where another layer of material is deposited.

In a preferred embodiment, this layer comprises a lightweight "mortar" which comprises a slurry of water and cement binding together a lightweight aggregate. The lightweight mortar layer 18 is laid in a viscous flowable state as hereinbefore defined. Some form of vibratory feed may be provided at the second station 14 to ensure continuous feeding of the layer 18 directly onto the uncured grc layer 16.

Shortly after the lightweight mortar layer 18 has been deposited at the second station 14, it is screeded by means of a second vibratory screeding bar 19 which again is guided so as to be, for example, accurately parallel with the undersurface defined by the base plate 10. The screeding bar 19 is preferably vibrated transversely of the direction of movement of the mould, by means of a vibrator which is indicated at 20 in the enlarged view which forms FIG. 4 of the drawings.

Although the grc layer 16 has not cured when the lightweight mortar layer 19 is laid on it, it must have sufficient strength in its uncured state to support the second layer. After the second depositor station, when the base plate 10 passes under the second screeding bar 19, some difficulties might be expected because of the relatively flowable condition of the underlying grc layer. One might expect that the grc layer 16 and the lightweight mortar layer 18 would intermingle to an unacceptable extent under the influence of the vibratory screeding bar 19 or that the relatively flowable state of the layer 16 would prevent the layer 18 from being acceptably consolidated and levelled.

Surprisingly, we have found that the screeding can be performed whilst both the lightweight mortar layer 18 and the grc layer 16 are in an uncured, flowable and wet condition, with considerable advantages.

These advantages can be enhanced by the use of the type of mould shown in FIG. 2 and described above. At the second depositor station, the side members 11 are raised to the dotted line position shown at 21, for example by means of suitable cams provided on the conveyor apparatus. The side members can then constrain the lightweight mortar and the grc to a region above the base plate 10 and prevent material being lost over the sides of the apparatus. In addition to preventing wastage, this enables a state of fluidisation to be built up in the grc substrate layer 16 when the two layers of the material pass under the screeding bar 19.

Figure 4:
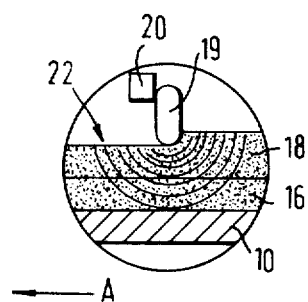
FIG. 4 is an enlarged diagrammatic view of a screeding and consolidating stage in the process.

To explain this phenomenon in more detail, reference should be made to FIG. 4 of the drawings which illustrates diagrammatically the region of the screeding bar 19.

The mould base plate 10 is travelling in the direction of the arrow A as before and carries the grc layer 16 which, it will be recalled, is in an uncured condition of sufficient strength to support the second layer 18. The two layers pass under the screeding bar 19 which is vibrated in a direction transversely of the direction of motion A. The material is constrained to the base plate 10 by means of the elevated side members in the position 21 and, in the region immediately beneath the screeding bar, the vibration of the screeding bar fluidises the cementitious binder of the material beneath it.

The effect of the vibration is felt primarily immediately adjacent the underside of the screeding bar 19 but there is also a radially extending zone of influence which is indicated generally at 22 in the drawings by a series of part circular arcs. This zone of influence is of course part-cylindrical, extending right across the base plate 10. A certain amount of fluidisation takes place within the zone of influence.

This fluidisation causes the consolidation of the lightweight mortar 18 and its intimate bonding to the wet substrate layer 16 of grc.

The effect is confined to the zone of influence 22. In the regions of the layer 16 immediately before and after the zone of influence 22, the grc layer 16 retains its uncured strength to which reference has previously been made. The fluidised material of the layer 16 within the zone of influence 22 is therefore confined between the less strongly fluidised adjacent regions and, in spite of its relatively liquid state, cannot escape from the zone 22 because it is so constrained. Additionally, the material is constrained at the ends of the screeding bar 19 by the elevated side members 11.

The upper layer 18 is fluidised and consolidated by the action of the vibrating screeding bar 19. The vibrations are transmitted through the upper layer 18 of the lower layer 16, creating in it a degree of fluidisation. Thus, a very good bond is obtained between the grc layer and the lightweight mortar layer so that the cement matrix is effectively continuous across the junction and only the other constituents differ. The upper surface is flat and smooth and, if the position and orientation of the screeding bar 19 is controlled by the side edges 12, the surface can be exactly parallel to the under surface of the sheet defined by the base plate 10, or otherwise have an accurately defined relationship with the undersurface.

Although the full advantages of the method may be achieved using the side members 11 to constrain the material at its edges, a satisfactory effect may be obtainable without the side members (except that the edges of the finished sheet need to be trimmed).

The first two layers of the material have thus been laid and the material passes under the third station 15, where a further grc layer 23 is added, again using a transversely moved spray head similar to that provided at the station 13. The further grc layer 23 is screeded by means of a further screeder bar 24 which operates in a precisely similar manner to the screeder bar 19. It will be appreciated that the zone of influence of the screeder bar 24 may or may not extend through to the lowermost layer 16 but that it will primarily promote intimate bonding of the layers 18 and 23 of lightweight mortar and grc respectively.

The three-layer sheet material emerging from the zone of influence of the screeding bar 24 continues along the conveyor system and is allowed to cure. An advantage of the process outlined is that, since the materials are wet when the three layers are superposed and since the cement matrix extends throughout the sheet material, all the layers cure together and hence there is no problem of different curing stages causing separation of the layers or curling of the sheet material.

The process described above is for the manufacture of a three-layer sheet material of sandwich construction, faced with grc. By using different materials, other types of sheet can be produced, for example, a sheet in which a substrate of lightweight mortar has a single facing sheet of grc. The method can clearly be extended to provide other types of sandwich or multiple sandwich material. It may or may not be necessary to provide vibratory screeding at each stage of the process. It will also be appreciated that the vibratory screeding bar 17 could be omitted from the apparatus shown although this does enable the first layer to be laid in a viscous condition and to be thoroughly consolidated.

Figure 5:
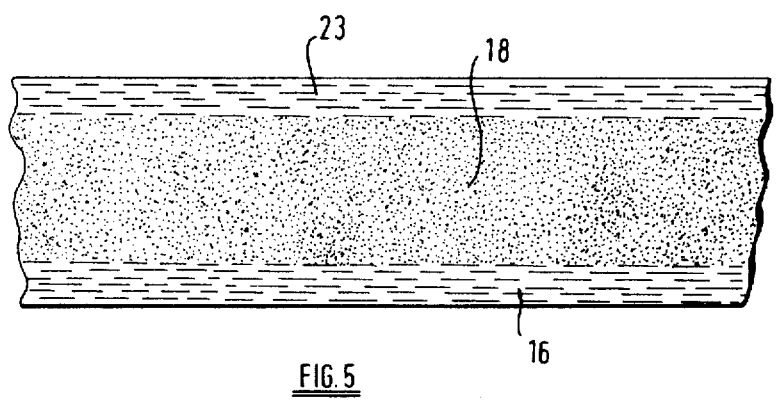
FIG. 5 is a cross-section through one form of sheet material embodying the invention and which may be produced by the process described with reference to FIGS. 2 to 4.

FIG. 5 shows part of a composite sheet of material which is produced by the method, operation of which was described with reference to FIGS. 2 to 4 of the drawings. This sheet material is only one example of various materials which can be produced using the method and has been developed specifically for use as a formwork for the casting of concrete. It may be used either as a temporary formwork, which is removed leaving the concrete surface exposed, or as a permanent formwork which is left in place after the concrete has set.

The material shown includes three layers 16, 18, 23. The central core layer 18 which occupies about two thirds of the thickness of the sheet is made of a lightweight mortar and this core is faced on each of its opposed faces by a layer of glass fibre reinforced cement having a thickness about one sixth that of the sheet. Each grc facing layer is made by spraying and consolidating a mixture of chopped alkali-resistant glass fibre of the type marketed under the Registered Trade Mark CEMFIL, together with a slurry of Portland cement, fine aggregate such as sand and water. By way of example, the ratio of cement, sand and water in the slurry may be 30:15:9 and we have found that the desirable quantity of glass fibre to be introduced into this slurry is approximately 5% by weight of the slurry. Proportions may vary according to the type of cement or fine aggregate used, or other factors. Alternative fine aggregates are crushed limestone or PFA (pulverised fuel ash).

The core is formed from a lightweight mortar which includes 100 parts cement, between 50 and 200 parts water and between 50 and 300 parts of PFA CENOSPHERES by weight. PFA CENOSPHERES are an example of a lightweight aggregate and comprise small hollow gas-containing microspheres which add to the volume of the cement without adding substantially to its weight. When cured, the cement matrix effectively forms a skeleton structure surrounding the bubbles.

We have found that a useful composition is one part by weight of cement to one part by weight of CENOSPHERES with between 0.65 and 1.1 parts by weight, (say 0.75 parts by weight) of water. However, the proportion of CENOSPHERES to be added can be varied between one half the weight of cement to three times the weight of cement. At the lower end of this range, both the strength and the density of the composition are quite high. At the upper end of the range, the density is extremely low compared with solid cement but the strength is also somewhat reduced.

Other forms of microspheres can be used instead of the cenospheres, or foamed plastics beads may be substituted. It may be desirable to produce a fire resistant material, in which case the use of organic materials may be objectionable and an inorganic lightweight aggregate may be preferred.

To improve the strength, some fibrous reinforcement may be added, for example alkali-resistant glass fibre or various types of synthetic plastics fibres.

The quantity of water to be used may vary considerably with the quantity of lightweight aggregate because, for example, PFA CENOSPHERES have a very high surface to weight-ratio and tend to adsorb a considerable quantity of water onto their surfaces, reducing the amount of free water which can be used for hydrating the cement.

In addition to the CENOSPHERES, air may be incorporated in the mix by the use of an air entraining additive. In addition, or alternatively, a plasticiser may be added. This enables the water content to be reduced. The action of some plasticisers is also time related and, for example, a very viscous mix incorporating a plasticiser may be quite flowable for a certain length of time but will undergo a pseudo-setting process after a time delay. This effect may be used with advantage in making the composite sheet.

The composite sheet material described, particularly when vibratory screeding is used in its manufacture, forms a cohesive sheet with hard and rigid facings which may have any desired surface finish, the core of the material being light in weight and the entire material having a continuous cementitious matrix, only the aggregate or reinforcement differing between the layers. The thickness of the sheet and parallelism of the faces can also be controlled by the means described above.

Such a material is extremely useful for formwork as a substitute or alternative for plywood. It is provided with strength and rigidity by its grc facings and the weight is reduced by the lightweight mortar substrate or core, compared with conventionally available solid grc.

In the example described, there are no large air voids in the material so that it is of homogeneous composition and strength throughout. This is achieved by use of the vibratory screeding method, combined with the use of CENOSPHERES to provide the lightweight core. Where air entraining agents are used, it has been found that the vibratory screeding does not prevent the entrainment of air.

Figure 1:
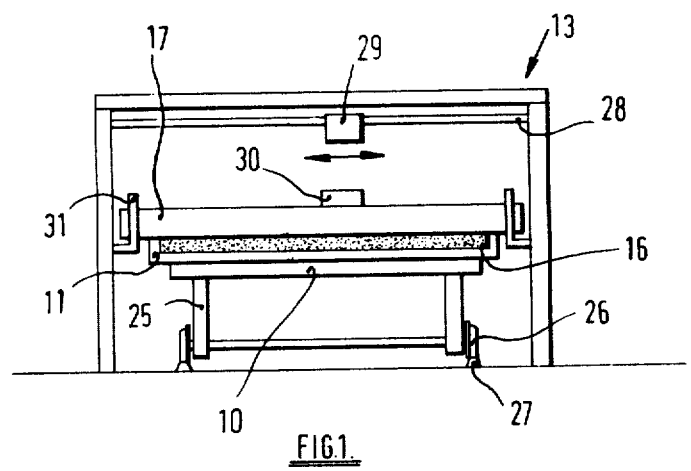
FIG. 1 is an end elevational view of an apparatus for producing composite sheet material.

Referring more specifically to the apparatus shown in FIG. 1 of the drawings, the base plate 10 and side members 11 have already been referred to. These are mounted on a carriage 25 which is provided with a plurality of wheels 26 running on tracks 27. The tracks run beneath a plurality of stations, of which the station 13 is illustrated. At this station, there is an overhead transverse rail 28 carrying the spray head 29 previously referred to for depositing the grc material on the base plate 10. The spray head traverses from side to side across the direction of movement of the carriage 25, along the overhead transverse rail 28. Immediately beyond the position at which the spray is laid down, the material forming the first layer 16 is screeded by the screeder bar 17 which is fitted with a vibrator 30. The screeder bar 17 is loosely mounted in slotted brackets 31 and is arranged to ride on the side members 11 of the base plate to control the thickness and parallelism of the layer 16 as described above. It will be noted that this takes place irrespective of any slight rocking or irregular movement of the carriage 25 on the tracks 27. The remaining stations of the apparatus are similar to the station 13 described above, with the exception that the spray head 29 may be replaced by depositor means for other types of material which do not require to be sprayed, for example the lightweight cementitious mortar referred to above.

It will be appreciated that many modifications may be made to the apparatus and to the method and composition described above, without departing from the scope of the invention. Such modifications, to produce different types of material for different purposes will be readily apparent to those skilled in the art, on the basis of the foregoing description.

An alternative to using chopped glass fibre to reinforce the facing layer(s) is the use of glass fibre mat of a woven or non-woven type. In this case a thin layer of viscous slurry is laid, the mat is unrolled onto this layer and a further slurry may then be added. It is believed that, where such a facing is laid as an initial layer, it may be sufficient to add a core layer and then consolidate both simultaneously by vibratory screeding.

Of course, fibres other than glass, for example metal or plastics fibres, might alternatively or additionally be used in any of the layers.

If desired the lateral constraint can be supplied by edge strips which remain part of the finished sheet and which are only temporarily secured to the mould.

The invention is likely to prove particularly useful in adding a layer to a core or substrate of cementitious material which is not reinforced with fibres, because, in an uncured condition, such materials tend to be more flowable than fibre reinforced materials. The invention enables a fibre reinforced material to be deposited and consolidated on the surface of an unreinforced material without the need for preliminary curing of the unreinforced material and its consequent disadvantages.

I claim:

1. A method of making a composite product including distinct layers of two different water-based curable compositions capable of bonding together on curing, the method comprising the steps of:

depositing a first layer of a first of said curable compositions onto a base member while said first composition is wet and uncured and in a viscous state having adequate strength to support a second layer but capable of flowing under the influence of vibration;

depositing directly and immediately onto said wet first layer a wet second layer of the second of said curable compositions without any prior treatment of the wet first layer other than levelling, the second composition being wet and uncured and in a viscous state but capable of flowing under the influence of vibration and the two layers meeting at an interface;

temporarily creating a localised zone of fluidization extending through said wet second layer to the interface between the wet first and second layers by the application of vibration to a small localised area of the surface of the wet second layer to promote intimacy and subsequent bonding of the first and second layers, the first and second compositions remaining viscous outside the said localised zone of fluidisation;

and allowing the first and second compositions to cure together to form the composite product.

2. A method according to claim 1 wherein at least one further wet layer is deposited on the wet second layer, such further layer being of a water-based curable composition capable of bonding to the composition of the preceding layer and all of said compositions being in a wet, uncured and viscous state capable of flowing under vibration, the successive wet layers being deposited directly and immediately one on another to define interfaces between the layers, and a temporary localised zone of fluidization being created, extending through at least the topmost layer to its interface with the preceding layer by the application of vibration to a small localised area of the surface of the topmost layer to promote intimacy and subsequent bonding of at least the topmost and preceding layers, the compositions remaining viscous and retaining their strength in the uncured state outside said localised zone of fluidization, the compositions finally being allowed to cure together to form the composite product.

3. A method according to claim 1 or claim 2 performed as a continuous process in which said base member moves through a plurality of stations at which said compositions are continuously deposited and said localised vibrations are applied.

4. A method according to claim 3 wherein side walls are provided on said base member and serve to guide and orientate means for applying said localised vibrations as the base member passes through at least one of said stations so as accurately to control the thickness and surface contour of the product.

5. A method according to claim 2 wherein first, second and third layers of water-based, curable compositions are deposited successively, the first and third layers being of the same curable composition and the second layer being of a composition different from that of the first and third layers.

6. A method according to claim 5 wherein the composition of the first and third layers is glass-fiber reinforced cement and that of the second layer is cementitious and includes a lightweight aggregate.

7. A method according to claim 1 wherein the water-based curable composition of each layer comprises a curable constituent and at least one other constituent, all of said layers having the same curable constituent to cause bonding together of the layers on curing.

8. A method according to claim 7 wherein the curable constituent is hydraulic cement.

9. A method according to claim 7 wherein the curable constituent is gypsum.

10. A method according to claim 7 wherein at least one of said layers includes fibers as such other constituent.

11. A method according to claim 10 wherein the fibers are of glass.

12. A method according to claim 9 wherein at least one of said layers includes a lightweight aggregate as such other constituent.

13. A method according to claim 12 wherein at least one of said layers additionally includes a fibrous reinforcement as such other constituent.

14. A method according to claim 12 wherein at least one of said layers additionally includes an air entraining agent as such other constituent.

15. A method according to claim 12 wherein at least one of said layers includes a plasticiser as such other constituent.

* * * * *